US012596696B1

(12) United States Patent
Rajendran

(10) Patent No.: US 12,596,696 B1
(45) Date of Patent: Apr. 7, 2026

(54) PRODUCT CONFIGURATOR WITH ARTIFICIAL INTELLIGENCE BASED KNOWLEDGE ENRICHMENT

(71) Applicant: Oracle International Corporation, Redwood Shores, CA (US)

(72) Inventor: Latha Rajendran, Doddenekkundi (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/045,753

(22) Filed: Feb. 5, 2025

(51) Int. Cl.
  *G06F 16/22* (2019.01)
  *G06F 16/245* (2019.01)
  *G06F 16/248* (2019.01)
(52) U.S. Cl.
  CPC ........ *G06F 16/2237* (2019.01); *G06F 16/245* (2019.01); *G06F 16/248* (2019.01)
(58) Field of Classification Search
  CPC .... G06F 16/2237; G06F 16/212; G06F 16/23; G06F 16/245; G06F 16/248
  See application file for complete search history.

(56) References Cited

U.S. PATENT DOCUMENTS

| | | | |
|---|---|---|---|
| 12,235,882 B1 * | 2/2025 | Chawla | ................ G06F 16/285 |
| 12,353,469 B1 * | 7/2025 | Mahabadi | ............ G06F 16/332 |
| 2024/0370476 A1 * | 11/2024 | Madisetti | ............ G06F 16/3329 |
| 2024/0403567 A1 * | 12/2024 | Dressler, II | ............ H04L 51/02 |
| 2025/0117414 A1 * | 4/2025 | McCurdy | ............ G06F 16/3329 |
| 2025/0117418 A1 * | 4/2025 | McCurdy | ............ G06F 16/3347 |

* cited by examiner

*Primary Examiner* — James E Richardson
(74) *Attorney, Agent, or Firm* — Potomac Law Group, PLLC

(57) ABSTRACT

Embodiments are directed to operating a cloud based product configurator. Embodiments store, as vectorized data in a vector database product, information corresponding to a first product to be configured. While configuring the first product, embodiments receive a query regarding the first product. Embodiments augment the query in response to a context based semantic search of the vector database using the query. Embodiments prompt a large language model ("LLM") using the augmented query and receiving an LLM response. Embodiments the provide the LLM response in response to the query.

20 Claims, 12 Drawing Sheets

Data Loader
402

Query Engine
404

Summarizer
406

Knowledge Enriched CPQ System
10

PRODUCT CONFIGURATOR WITH ARTIFICIAL INTELLIGENCE BASED KNOWLEDGE ENRICHMENT

FIELD

One embodiment is directed generally to a product configurator, and in particular to knowledge enrichment for a product configurator.

BACKGROUND INFORMATION

A product/services configurator, or a Configure, Price, Quote ("CPQ") system, is a computer system that streamlines and automates the processes of configuring complex products or services, determining accurate pricing, and generating professional quotes for customers.

In general, a CPQ system enables users to select and customize products or services according to customer requirements. This is especially useful for complex products with multiple options, features, and dependencies. A CPQ system calculates accurate pricing based on the configuration and applies discounts based on customer's pricing terms. It ensures pricing consistency and eliminates manual errors. Further, a CPQ system quickly generates professional and tailored quotes or proposals, often including terms, conditions, and branding. Quote proposals can usually be sent directly to customers from the CPQ system.

CPQ systems are commonly used in industries such as manufacturing, technology, telecommunications, and software-as-a-service ("SaaS"), where product offerings are customizable or pricing structures are complex.

SUMMARY

Embodiments are directed to operating a cloud based product configurator. Embodiments store, as vectorized data in a vector database product, information corresponding to a first product to be configured. While configuring the first product, embodiments receive a query regarding the first product. Embodiments augment the query in response to a context based semantic search of the vector database using the query. Embodiments prompt a large language model ("LLM") using the augmented query and receiving an LLM response. Embodiments the provide the LLM response in response to the query.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 4 is a block diagram of the knowledge enriched CPQ system in accordance to embodiments.

FIG. 6 is a screenshot showing a product workbench page with an upload option in accordance to embodiments.

DETAILED DESCRIPTION

Embodiments are directed to a product configurator (also referred to as a Configure, Price, Quote ("CPQ")) system that enriches information regarding a product or service (for purposed of this disclosure, "product" includes products, services, and any other element that can be configured) being configured with additional information using Artificial Intelligence ("AI"). Embodiments implement Retrieval Augmented Generation ("RAG") to enhance AI quality by enabling large language models ("LLMs") to tap into all data sources without the need for retraining.

Embodiments enrich the CPQ customer's sales representative with required information for faster and timely closure of sales. Embodiments provide a framework for the CPQ user to store documents specific to their products in a cloud infrastructure's object storage bucket. Embodiments provide a representational state transfer ("REST") end point to integrate with the object storage bucket to store the product related documents in the object storage. Before storing the document, each document may be uniquely identified by a string which includes the CPQ product identifier ("ID"). The documents are tokenized and converted to vector data in numeric form before being stored in a vector database. If all or substantially all of the product sales document, product manual, invoice, sales contract/agreement and network diagrams are stored into the system, embodiments can generate a summary of the product which can be displayed in a configurator user interface ("UI") with a UI control. Further, embodiments can include a chatbot to enable additional query based search to get further detailed information about the product.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
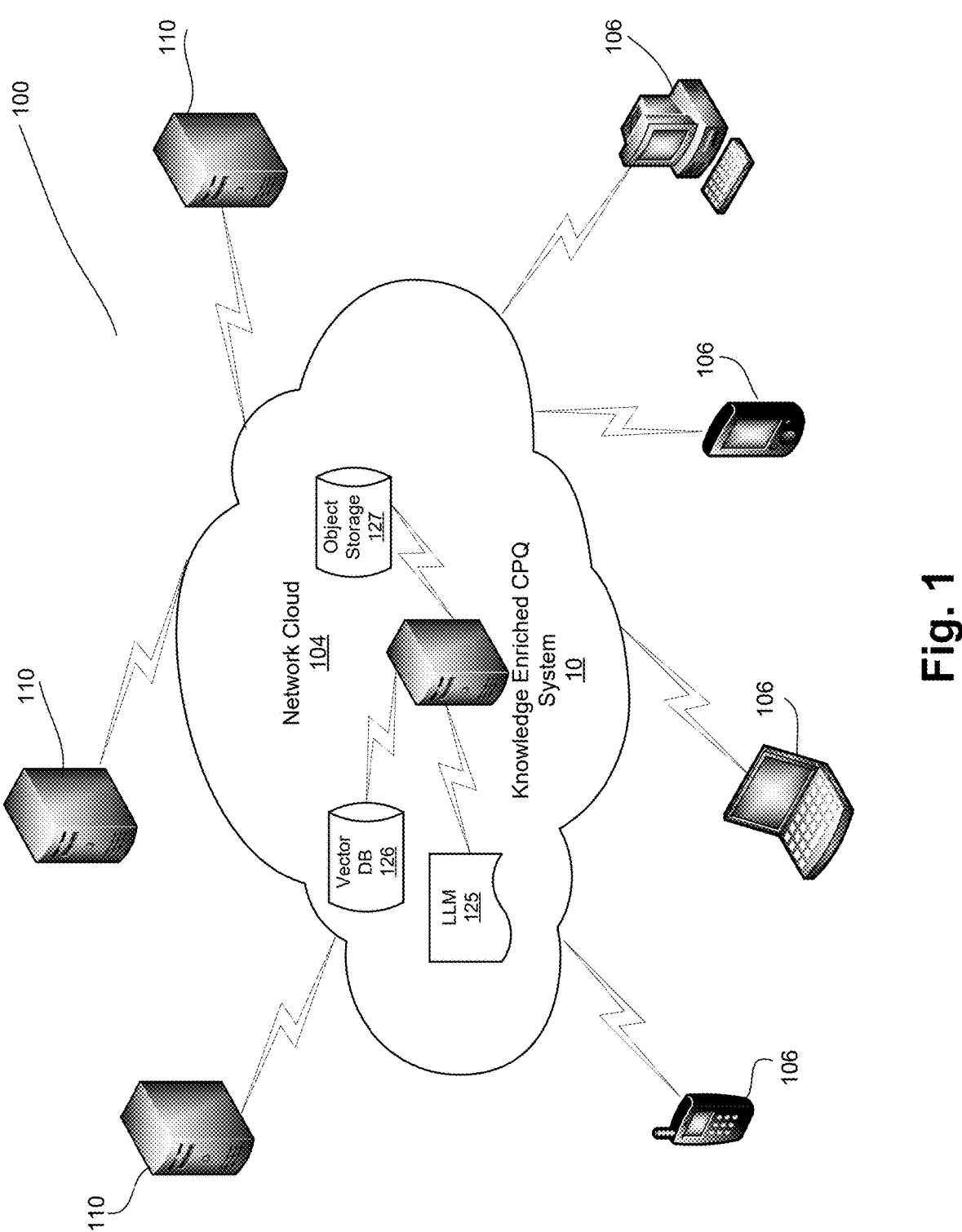
FIG. 1 illustrates an example of a system that includes a knowledge enriched CPQ system in accordance to embodiments.

FIG. 1 illustrates an example of a system 100 that includes a knowledge enriched CPQ system 10 in accordance to embodiments. Knowledge enriched CPQ system 10 may be implemented within a computing environment that includes a communication network/cloud 104. Network 104 may be a private network that can communicate with a public network (e.g., the Internet) to access additional services 110 provided by a cloud services provider. Examples of communication networks include a mobile network, a wireless network, a cellular network, a local area network ("LAN"), a wide area network ("WAN"), other wireless communication networks, or combinations of these and other networks. Knowledge enriched CPQ system 10 may be administered by a service provider, such as via the Oracle Cloud Infrastructure ("OCI") from Oracle Corp.

Tenants of the cloud services provider can be companies or any type of organization or groups whose members include users of services offered by the service provider. Services may include or be provided as access to, without limitation, an application, a resource, a file, a document, data, media, or combinations thereof. Users may have individual accounts with the service provider and organizations may have enterprise accounts with the service provider, where an enterprise account encompasses or aggregates a number of individual user accounts.

System 100 further includes client devices 106, which can be any type of device that can access network 104 and can obtain the benefits of the functionality of knowledge enriched CPQ system 10 for configuring products and services. As disclosed herein, a "client" (also disclosed as a "client system" or a "client device") may be a device or an application executing on a device. System 100 includes a number of different types of client devices 106 that each is able to communicate with network 104.

Executing on cloud 104 (or otherwise in communication with knowledge enriched CPQ system 10) is at least one large language model ("LLM") 125. An LLM is a type of artificial intelligence ("AI") model that is trained on a large amount of text data. An LLM can generate text, summarize text, translate text from one language to another, write different kinds of creative content, and answer questions in an informative way. In general, an LLM is a machine that has been taught to understand and use language the way that humans do. An LLM can read and write, and can understand and respond to complex questions. Examples of LLMs that can be used in embodiments include Open AI's "GPT" models, "Bard AI", Meta's LLaMA, and various opens source LLMs. Embodiments can be implemented with any large LLM. However, LLMs trained with domain specific data can provide more accurate results. Embodiments provide a framework to augment LLMs with a customer business domain specific data set stored on and derived in conjunction with operating a configurator and using RAG technology.

Further executing on cloud 104 (or otherwise in communication with knowledge enriched CPQ system 10) is at least one vector database ("DB") 126. A vector database is a database that can store vector embeddings. Vector embeddings are high dimensional numeric representation of objects or unstructured data which preserves the data's essential properties. Vector data, once prepared, is stored in a vector database. A goal of creating an embedding is to map data into a vector space where (1) Similar data points are close together (low distance); and (2) Dissimilar data points are far apart (high distance). Subsequently, when a user prompt/query is received, metrics such as dot product, cosine similarity or Euclidean distance are used to compare, measure relationship and retrieve information.

Vector embeddings stored in a vector database are optimized for fast similarity search and retrieval with indexes. Vector databases store data in the form of vectors, which are arrays of numbers that represent data points. In one embodiment, vector DB 126 is implemented by the "Oracle 23 AI Database" from Oracle Corp.

Further executing on cloud 104 (or otherwise in communication with knowledge enriched CPQ system 10) is at least object storage 127. Object storage enables storing and managing large volumes of unstructured data in a cloud infrastructure system. Each object that can be stored in Object Storage bucket includes: (1) data, which is the actual content or file being stored, such as an image, document, video, or binary file or product manual; and (2) metadata, which is descriptive information about the object, such as its name, size, creation date, file type, and custom tags for organization or any unstructured data.

Figure 2:
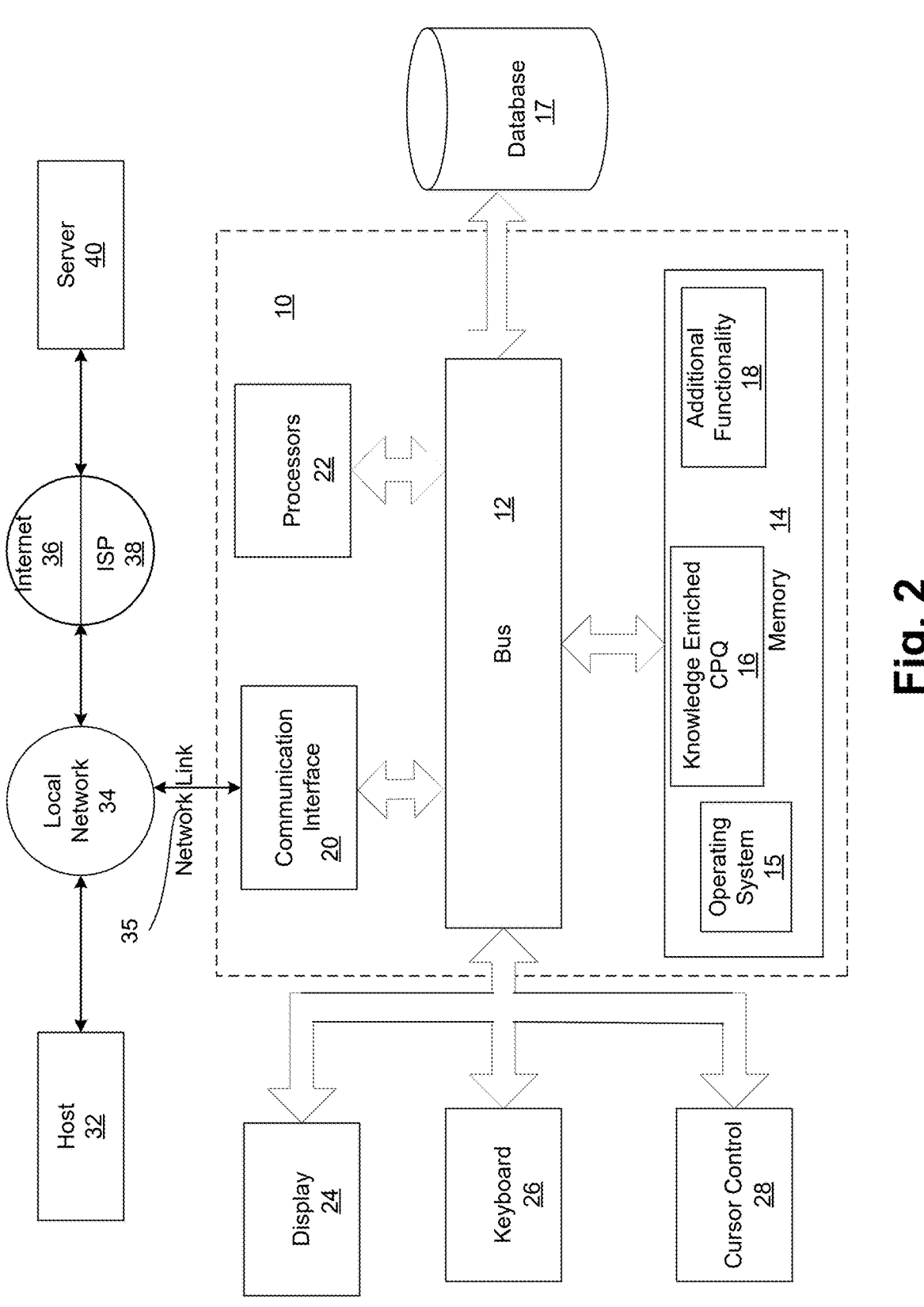
FIG. 2 is a block diagram of the knowledge enriched CPQ system of FIG. 1 in the form of a computer server/system in accordance to an embodiment of the present invention.

FIG. 2 is a block diagram of knowledge enriched CPQ system 10 of FIG. 1 in the form of a computer server/system 10 in accordance to an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. One or more components of FIG. 2 can also be used to implement any of the elements of FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication interface 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a knowledge enriched CPQ module 16 that provides knowledge enriched CPQ, and all other functionality disclosed herein. System 10 can be part of a larger system. Therefore, system 10 can include one or more additional functional modules 18, such as a customer relationship management ("CRM") or enterprise resource planning ("ERP") system that utilizes the knowledge enriched CPQ functionality. A file storage device or database 17 is coupled to bus 12 to provide centralized storage for modules 16 and 18, including training data used to generate ML models, and for storing configuration elements (i.e., a configurator or CPQ database). In one embodiment, database 17 is a relational database management system ("RDBMS") that can use Structured Query Language ("SQL") to manage the stored data.

In embodiments, communication interface 20 provides a two-way data communication coupling to a network link 35 that is connected to a local network 34. For example, communication interface 20 may be an integrated services digital network ("ISDN") card, cable modem, satellite modem, or a modem to provide a data communication connection to a corresponding type of telephone line or Ethernet. As another example, communication interface 20 may be a local area network ("LAN") card to provide a data communication connection to a compatible LAN. Wireless links may also be implemented. In any such implementation, communication interface 20 sends and receives electrical, electromagnetic or optical signals that carry digital data streams representing various types of information.

Network link 35 typically provides data communication through one or more networks to other data devices. For example, network link 35 may provide a connection through local network 34 to a host computer 32 or to data equipment operated by an Internet Service Provider ("ISP") 38. ISP 38 in turn provides data communication services through the Internet 36. Local network 34 and Internet 36 both use electrical, electromagnetic or optical signals that carry digital data streams. The signals through the various networks and the signals on network link 35 and through communication interface 20, which carry the digital data to and from computer system 10, are example forms of transmission media.

System 10 can send messages and receive data, including program code, through the network(s), network link 35 and communication interface 20. In the Internet example, a server 40 might transmit a requested code for an application program through Internet 36, ISP 38, local network 34 and communication interface 20. The received code may be executed by processor 22 as it is received, and/or stored in database 17, or other non-volatile storage for later execution.

In one embodiment, system 10 is a computing/data processing system including an application or collection of distributed applications for enterprise organizations, and may also implement logistics, manufacturing, and inventory management functionality. The applications and computing system 10 may be configured to operate locally or be implemented as a cloud-based networking system, for example in an infrastructure-as-a-service ("IAAS"), platform-as-a-service ("PAAS"), software-as-a-service ("SAAS") architecture, or other type of computing solution.

As disclosed, embodiments enrich product/service information for a CPQ system. As an example use case, assume "John" is a sales representative in a car company for car sales/subscription. Car sales use CPQ for the business to business ("B2B") selling or renting of cars. He gets a customer query for a sport utility vehicle ("SUV") order. When he navigates to the configurator page of the SUV which the customer prefers, he has an option to open a "Product Intelligence" page in the configurator. He can see information about the last sales/renting (leasing) transaction that has occurred for the product based on location, date range, customer segment, etc., including how many were sold/leased with what configuration and the details of the contract agreement. A chatbot is available if he wants any additional detailed information. This provides the sales rep with all information about the selected product and information about what factors are important for buyers in that area. This helps in faster closure of sales.

Further, John is part of a big sales team based in North America. The sales team will be provided with the option to upload all product related documents during a configurator session, which could be informative for faster closure of subsequent sales. They can upload invoice, receipts, sales contract document, quote proposal documents, email communication and manuals of vehicles in the system. All documents related to a product are uniquely identified by a unique identifier or CPQ product string.

Figure 3:
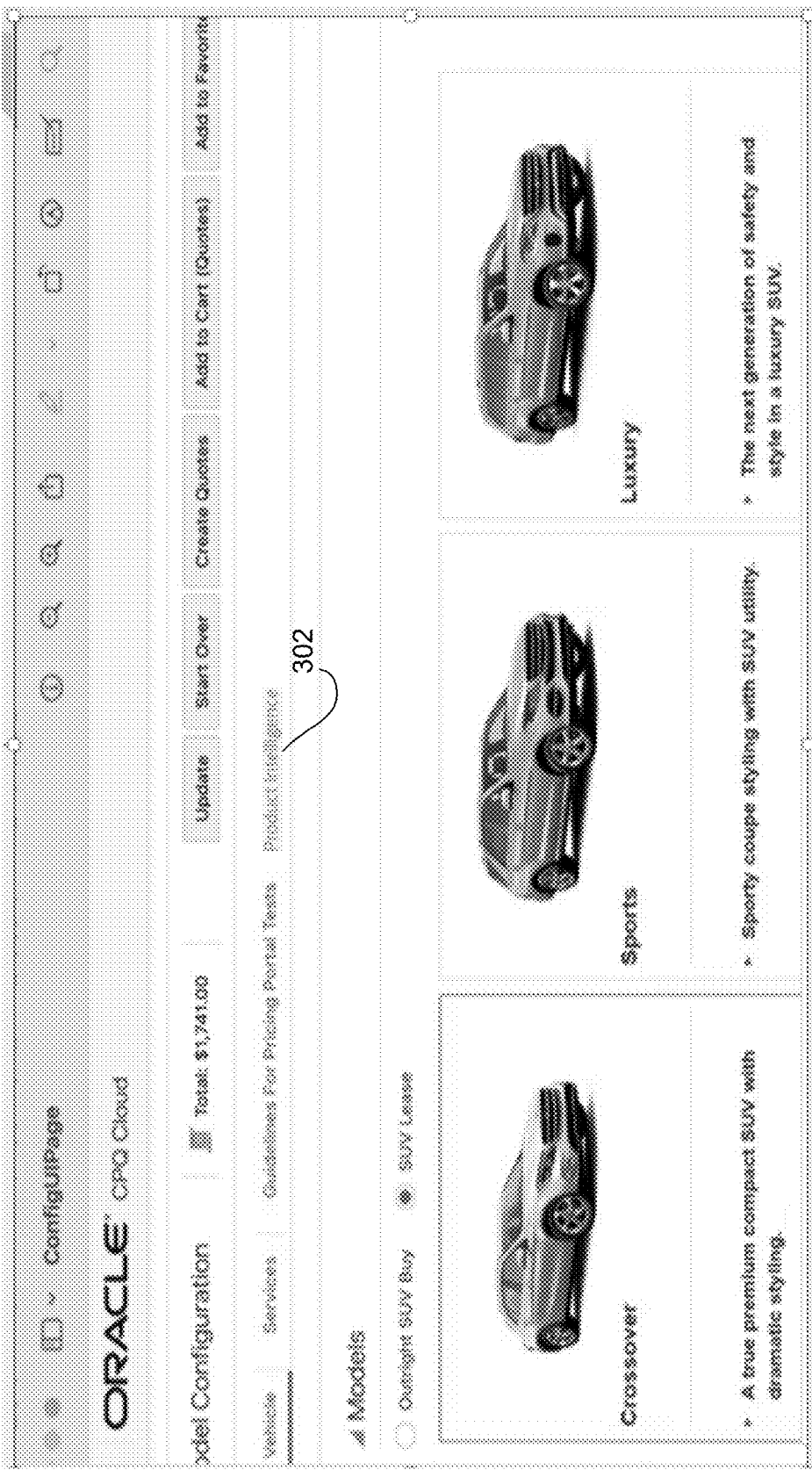
FIG. 3 is a screen shot of a user interface in accordance with embodiments.

FIG. 3 is a screen shot of a user interface in accordance with embodiments. As shown in FIG. 3, when a product (i.e., SUV car models) is open for configuring in the configurator, an option/tab 302 is provided to open a "Product Intelligence" page which will display the enriched information specific to the product opened in configurator.

Figure 4:
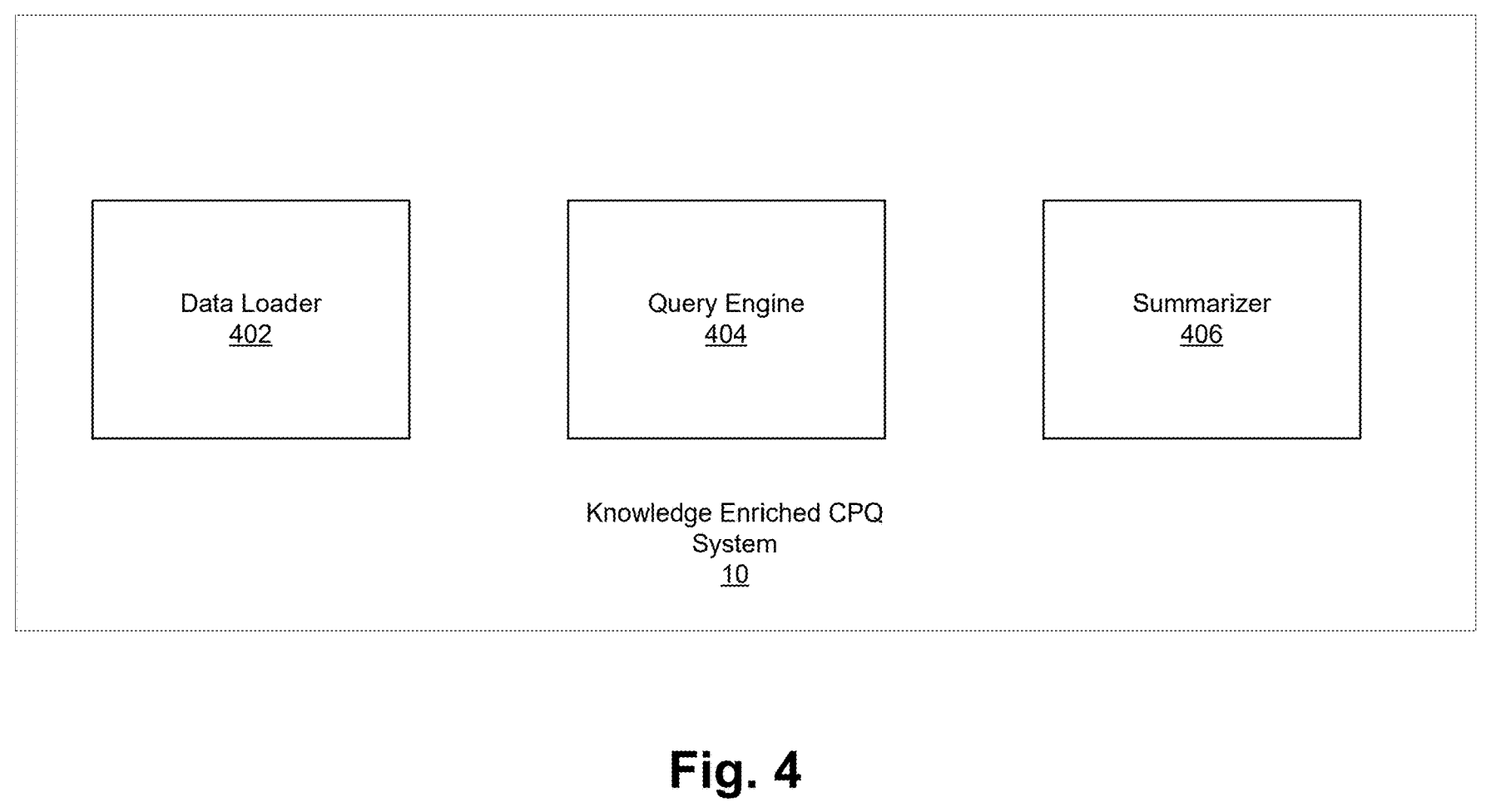

FIG. 4 is a block diagram of knowledge enriched CPQ system 10 in accordance to embodiments. System 10 includes a data loader 402 that provides an option and location for storing product related documents and later retrieving the document. Data loader 402 processes and generates vector embeddings of the documents and stores the vectorized data in vector DB 126. In embodiments, vector DB 126 is implemented by the "Oracle 23 AI vector database", which is an Oracle relational database with capabilities to incorporate vector data and has built-in AI support which enables applications hosted in OCI to leverage generative AI. In embodiments, data loader 402 processes documents and converts them to numerical embedding using OCI in build AI vector services which is then stored in vector DB 126.

System 10 further includes a query engine 404 that, with a unique product string, can prepare the context based search of vector DB 126 and then use LLM 125 to provide a response. Query engine 404 is used to query product information in response to a user prompt/query. Query engine 404 performs context based semantic search in vector DB 126 to augment the prompt before prompting the generative AI model (e.g., LLM 125) to generate a response. In embodiments, a "Product Intelligence" page of the CPQ can provide a sales representative with various query options, including a chatbot.

As an example of the functionality of query engine 404, when a user enters a query in a chatbot requesting information in the Product Intelligence page about the product currently opened for configuring in the Oracle CPQ configurator, the CPQ system prepares the unique string which identifies the product in the background. The knowledge base stored in vector DB 126 by data loader 402 is queried using the prepared product string and the user query is used to set the context for the query. The user query is tokenized and a semantic search is performed along with the unique product string in the RAG based vector database knowledge repository. The query result is then augmented with the user's previous query and the query/response in RAG memory. The augmented information is passed as a prompt for LLM 125 to generate a response for the query The following is an example of an augmented query in accordance to embodiments:

(1) First query in chatbot: "Does luxury SUV have Bluetooth & USB C-ports mobile charging?

(2) Second query in chatbot: "Does SUV has dedicated or data enabled USB C-ports in rear seat?

A vector search is performed in the Oracle 23 AI vector database to fetch the digitized data of the SUV with the unique Product String (fetched from the configurator context) and a tokenized user query. Of note, the manual/brochures of all SUV models in embodiments have been vectorized and stored in vector DB 126 by data loader 402. The query is executed in vector DB 126 to get the USB Port and its type, its details and the network diagram for the rear seat. The query result from vector DB 126 is augmented with the query/ response from the chatbot memory. This helps in augmenting the prompt to LLM 125 to focus on the luxury model, Bluetooth and all charging support available in the SUV for mobile (picked from the first query/ response in RAG/chatbot memory). LLM 125 then generates the response based on the prompt. The response will have the USB C-port supported in SUV focusing on luxury SUV models and its network diagram generated based on query/response received from the RAG based vector DB 126. The LLM response also will provide details of various USB C-port charges available in the market, its comparison, features and compatibility with various devices. In general, the response will be tailored based on the customer preference, in the context of the current product and understanding the customer's inclination, which may convince the customer armed with the data to select the right model which best suits them.

System 10 further includes a summarizer 406 that, in one embodiment, can be implemented by OCI "Functions" integrating with object storage 127 to retrieve the documents and integrating with an LLM generative and retrieval model (in one embodiment the Generative AI cohere model from Oracle Corp.) to provide a summary of the product information. OCI Functions is a serverless compute service that lets developers create, run, and scale applications without managing any infrastructure. OCI Functions have native integrations with other Oracle Cloud Infrastructure resources and can be exposed as a REST endpoint for SaaS applications to consume the same. Summarizer 406 supports summarization of data and enables context based prompting of the data. Sources of summarizer 406 can be one or more of: (1) Data prepared by an SQL query on the configurator DB based on user selected criteria; (2) Response of a semantic search performed on vector DB 126 based on a user prompt using a unique product string/code; or (3) A document uploaded in object storage 127.

Figure 5:
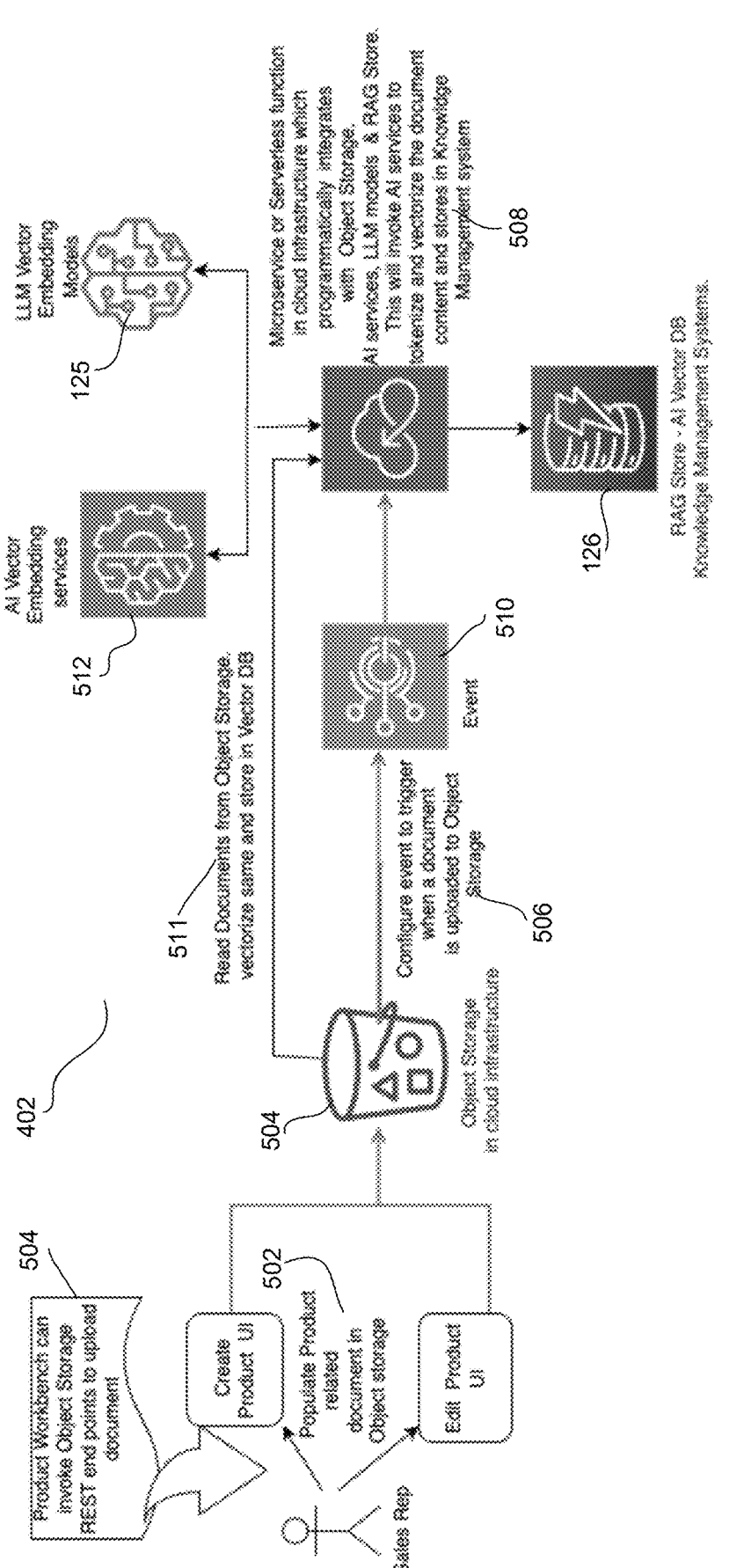
FIG. 5 is a block/flow diagram of a data loader in accordance to embodiments.

FIG. 5 is a block/flow diagram of data loader 402 in accordance to embodiments. Data loader 402, in general, processes the uploaded documents, converts the processed documents to vector data, and stores the vector data in vector DB 126. This builds the product intelligence source for system 10.

Data loader 402 includes object storage 127 in a cloud infrastructure. Object storage 127, in general, is a data storage architecture for storing unstructured data, which sections data into units (i.e., objects) and stores them in a structurally flat data environment. In embodiments, object storage includes representational State Transfer ("REST") endpoints to upload all product related information including manuals, brochures, images, invoices, network diagrams, quotes, contract documents and any other informative document during a configurator session. Object storage 127 allows storage of unstructured documents such as invoice images and product manuals. In embodiments, each document is uniquely identified by a product string prefix.

Embodiments enable automated historical data collection. In one embodiment, when a quote is created after configuring the product, system 10 will have the quote attributes and values as a JavaScript Object Notation ("JSON") file. Upon quote submission, at 502, 504, the quote data is uploaded to object storage 127. These documents will then be vectorized and stored in vector DB 126 at 508 in response to a triggered event at 506. Embodiments can configure quote documents such as a quote proposal, invoice, etc., using a document generator and associate the same with a commerce process. These document as well can be programmatically uploaded when the quote is submitted. This will reduce the manual effort of uploading documents to build history data.

Figure 6:
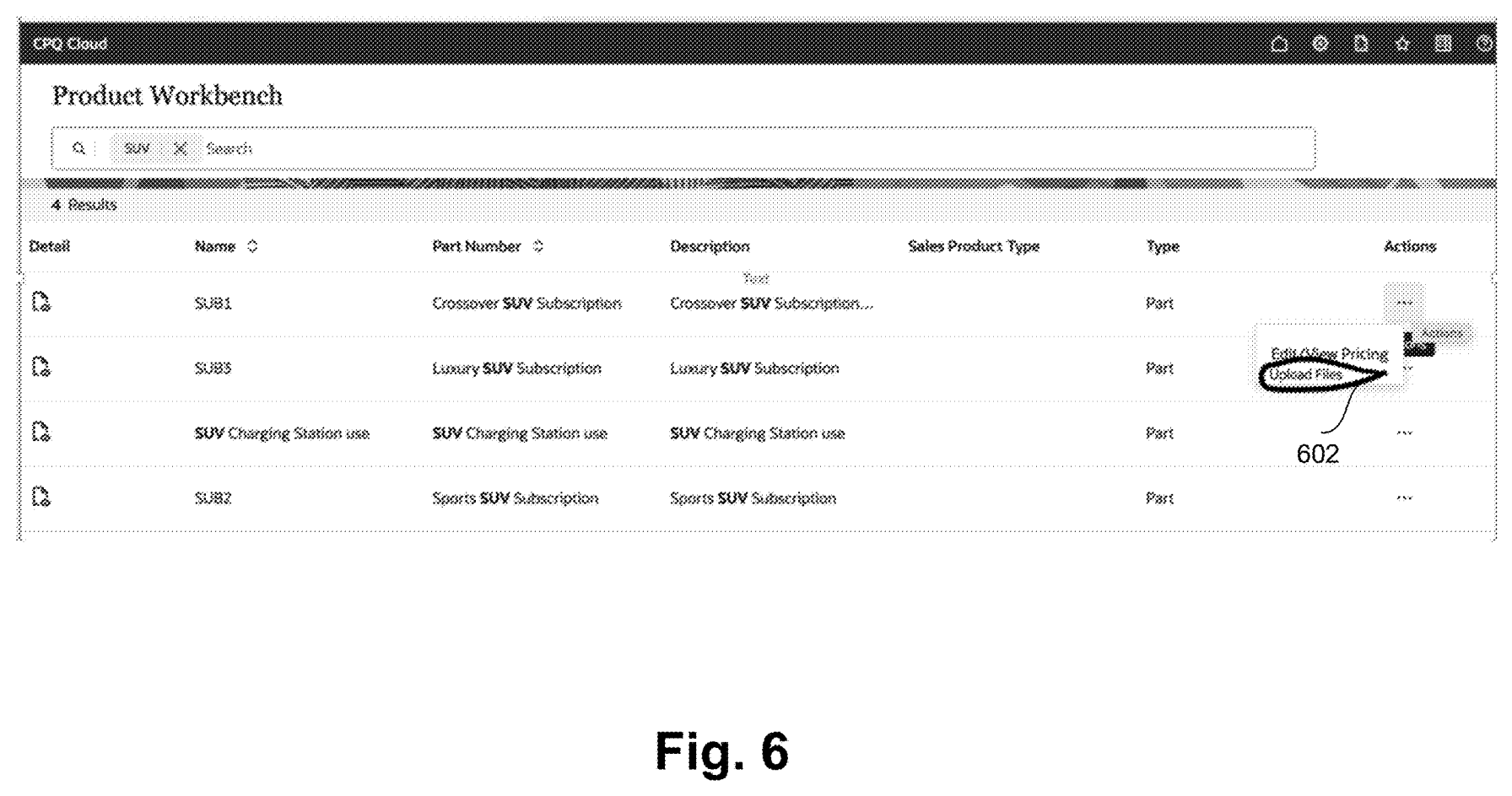

Embodiments further enable the manual upload of documents. When a product is added to the system (e.g., in the "Product Workbench" page of Oracle CPQ), embodiments provide an option to upload documents related to the product, such as a product manual, installation instruction, brochure, etc. FIG. 6 is a screenshot showing a product workbench page with an upload option 602 in accordance to embodiments.

Before uploading the document to object storage 127, the document will be automatically prefixed with a code string which will be a unique product identifier which maps the document to a specific product (also referred to as "product string"). Later, the product unique string can be used to retrieve the product information. In embodiments, the code string will be autogenerated for each product and will be available in memory when a product is open for configuring in the configurator in the user interface. In one embodiment, the document name starts with "CPQPROD_{uniqueproductId in CPQ}_{document Name such invoice/product manual/contract}. This enables retrieving all documents belonging to same product by querying for all files starting with CPQPROD_xxx_*. Appropriate indexes can be added in the vector database for the unique product string. This will improve the performance while fetching documents that correspond to a unique product string.

In embodiments, the OCI Function can be used for integrating various OCI resources and AI services. Files in object storage 127 can be fetched, processed and converted to vector data type (e.g., extract text or generate embeddings using ML models) at 511 and then the processed vector data is stored into the vector DB 126 (e.g., Oracle 23 AI vector database).

One embodiment is implemented in OCI using OCI functions, object storage, OCI AI services, and an LLM available in OCI. In this implementation, embodiments at 506 configure an object storage event 510 that triggers the OCI Function whenever a new document is uploaded to object storage 127. A vector database service triggers a vector chain when a document is received. It will extract all text from the document, split it by chunks, embed those with local embedding and store them as vectors. The vector data is persisted in numerical form using an embedded language model, a special algorithm designed to embrace competence.

Embodiments utilize OCI AI services 512, such as OCI Vector search and OCI Document Understanding service, which extract data from unstructured documents (e.g., PDFs, images, invoice, receipts, excel charts) and transform them into vector data which then can be vectorized and stored. OCI AI services 512 assists in splitting documents into chunks and helps to create vector embedding to store in vector DB 126.

OCI AI service 512 also assists query engine 404 to perform semantic search. A semantic search can be executed on top of this data to get a more relevant chunk for input query. The semantic search narrows the search and provides the right meaning of a query by using deep learning models for the specific words and phrases in the prompt.

Figure 7:
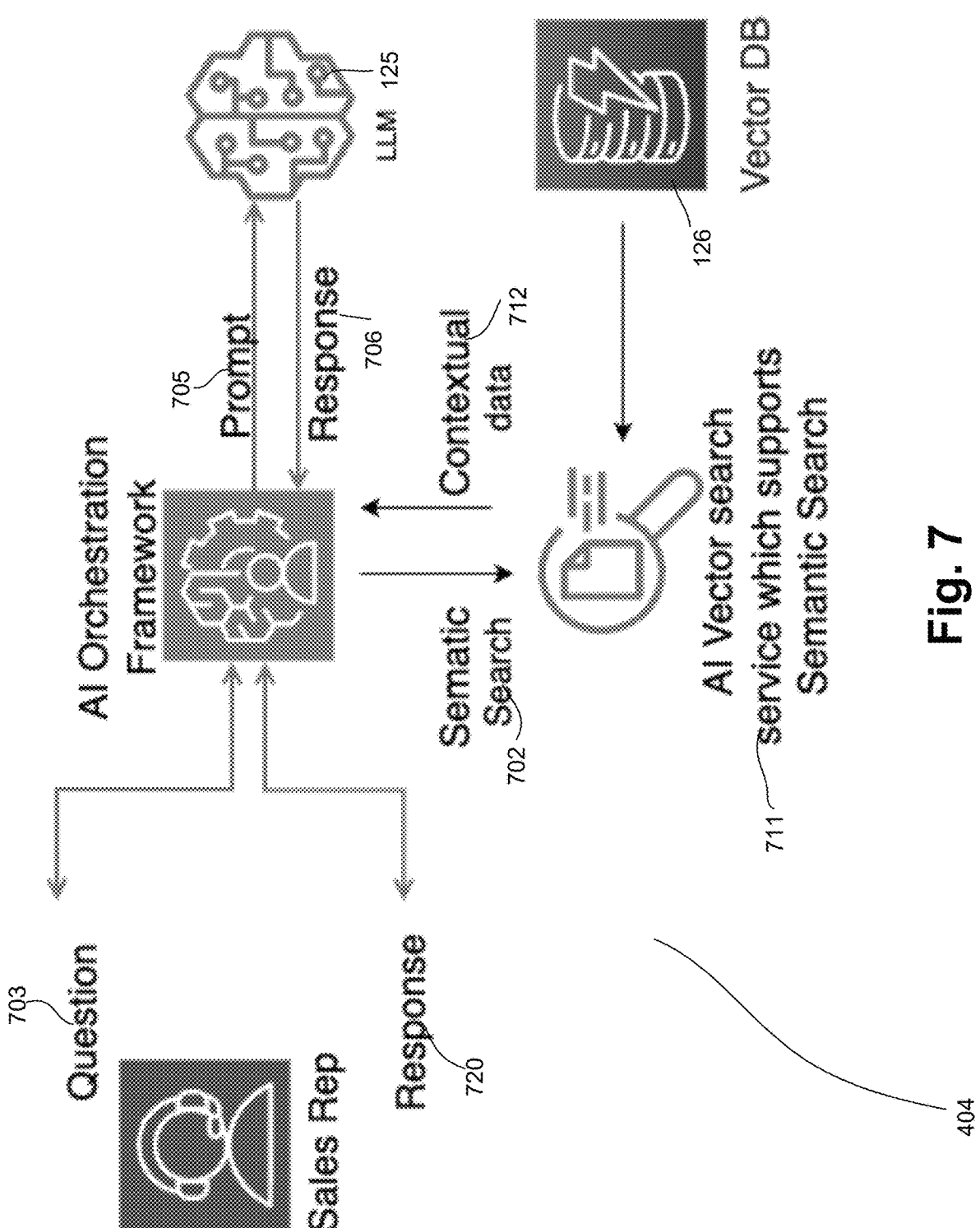
FIG. 7 is a block/flow diagram of a query engine in accordance to embodiment.

FIG. 7 is a block/flow diagram of query engine 404 in accordance to embodiment. Query engine 404 executes a semantic search 702 of a user prompt/question 703 against system 10 to augment the prompt (augmented prompt 705) before invoking the LLM 125. Query engine 404 in embodiments can be implemented as an OCI function or as a microservice in OCI. When the sales representative at the configurator enters a prompt/question/query 703 in a Product Intelligence page, query engine 404 is invoked with following inputs: (1) Unique product string of the product selected in the configurator; (2) Prompt (query) entered by the user; and (3) Real time data queried from the configurator database, if any.

As an example of the functionality of query engine 404 in one embodiment, assume a question is "Which SUV model is preferred by young crowd in Texas?" CPQ system 10 generates a query to fetch all SUV transactions where customer segment is 'young' and region of sales is 'Texas'. The query result (i.e., Real time data) along with the user query and the product unique string is passed as parameters to query engine 404. A vector search is performed in the Oracle 23 AI vector database 126 to fetch the details of the SUV with the unique Product String and the user query. Previously, the manual/brochure of all SUV models are vectorized and stored in vector DB 126 by data loader 402. Data, thus fetched, is augmented with the previous query/response from RAG/configurator memory for the same product. For example, if the user queried about the performance of various SUV models in a previous query. Now the augmented prompt to LLM 125 will include the following:

(1) Real time data from the CPQ DB which will have information about the SUV sold to the customer segment (young) in region (Texas). This is the context data.

(2) The query result from the vector DB after performing the semantic search with the user query and unique Product String. In other words this is data from the RAG/configurator based knowledge base.

(3) Details of various SUV model performance (i.e., the previous user query and response from previous conversation memory).

When these three pieces of information are included in the prompt to LLM 125, it generates a response which focuses on features addressed to the young buyers, highlighting performance and model preference trends observed by young car buyer's/renter's in the Texas region. In general, the response will be tuned based on the customer preference and inclination, which might convince the customer, armed with this data, to select the best and most suitable model for their preference.

Semantic search narrows the search and provides the right meaning of a query by using deep learning models for the specific words and phrases in the prompt. Though the traditional search focuses on keywords, semantic search dives deep into retrieving the meaning of questions and source documents. It utilizes these meanings and gives more accurate results.

In embodiments, query engine 404 is integrated with the AI Vector Database, Vector search services, LLM (Large Language Model) and chatbot memory. The user prompt can be split into chunks, and then a semantic search is performed in the AI Vector Database 126 to retrieve relevant information. While processing the query, along with the current result, previous query details from the chatbot memory are also fetched and passed as a prompt 705 to the LLM models in OCI. LLM 125 processes this combined information and generates a response. The generated response from the LLM is updated in the previous conversation memory to maintain context for future queries. There are many ways to implement the previous conversation memory, including short term memory which is temporary and session based or long term memory which is persisted across session in the vector DB or a relational database. The response is then displayed in the configurator intelligence page.

When a specific prompt is fetched to Generative AI, the query gets transformed to a vector and the response is sent to the database. The information is then retrieved from the database at 711, correlating with the prompts that were sent. The contextual information 712 and original prompt is pushed into LLM 125 which generates a text response 706 that is accurate. Query engine 404 retrieves a semantic search and ranks the most relevant chunks and inputs that chunk to the synthesizer to generate a response 720 to the user query.

As disclosed, query engine 404 functions as a chatbot in response to prompts. The following is a disclosure of sample prompts that correspond to the SUV vehicle in FIG. 3. In embodiments, the following can be the input to query engine 404: (1) Product String; (2) User Prompt. Example prompts can be as follows:

Does SUV sports model has Bluetooth charger for iPhone?

Is there a hybrid SUV model available?

Which SUV model has sunroof panel which is voice enabled?

Does the SUV Luxury model come with C-type charger?

What is the seating capacity of crossover model?

Example prompts can be used for trending configurations. This functionality displays the configuration that is mostly accepted for the selected criteria. The criteria can be a geographic location, country, PIN code, region, customer segmentation, color, date range, etc. The criteria may be displayed in a drop down list in the UI with an option to select one of the criteria. With the product ID from context and criteria, the product DB can be queried to get Product configurations from past sales of the same product. In this example, the following can be the input to query engine: (1) query result; (2) user prompt; (3) product string. Example user prompts for the vehicle model could be as following:

Which SUV configuration is most sold in the U.S.? Which is the most preferred configuration of SUV sold in the last year?

How many luxury models are sold?

What configuration of sports model is preferred by woman the most?

Example prompts can be used to generate a past sales summary. The sales representative can be provided with a UI option to select any criteria, such as geographic location, country, PIN code, region, customer segmentation, color, date range, customer, etc. The query can be to select from the product database all submitted quotes based on selected criteria and product ID. The sales representative may want to understand what this customer prefers based on previous sales of the product. This might be helpful for a subscription business. Information on previous pricing might provide sales representative information to price the current sale. The following could be the input to query engine: (1) query result; (2) user prompt; (3) product string. The following are example prompts:

What is the average selling price of crossover model? What is the price range?

How many sports model where sold? At what price?

Did any luxury models sell?. If yes, what price range?

Get all past sales pricing information,

Does price vary based on number of products purchased?
    Plot a graph based on number of product sold and price of product.

Example prompts can be used to generate product summary information. The product DB can be used to augment the prompt. In embodiments, the product database will be queried with the product string (performed semantic search) to prepare the prompt before invoking LLM. The following can be the input to query engine: (1) product string; (2) user prompt. Example prompt are as follows:

Get summary of the selected product's features.

Get summary of the selected product's performance.

Get summary of the selected product's sold configurations.

Get summary of selected product's network diagram.

Example prompts can be used to generate product reviews based on collected feedback after each sale. Feedback can be categorized based on criteria such as:

feedback on sales
feedback on product performance
feedback on product features
feedback on post sales support
feedback on pre-sales support
feedback on maintenance support.

All of above feedback needs to be collected and built over a period of time to get a product review summary. After each sale, the feedback collected for the product can be uploaded to system 10 to generate a product review summary. Further, there can be option to sort, select and read reviews from past sales which helps the customer affirm the genuineness of the review. The following can be the input to query engine: (1) product string; (2) user prompt. Example prompts are as follows:

Get review summary of selected product from past sale.

Get review summary of selected product with regard to performance.

Get review summary of selected product with regard to performance of 'xxx' feature.

Get review summary of selected product with respect to 'xxx' feature.

Get review summary of selected product on maintenance support

Get review summary of sales experience.

Figure 8:
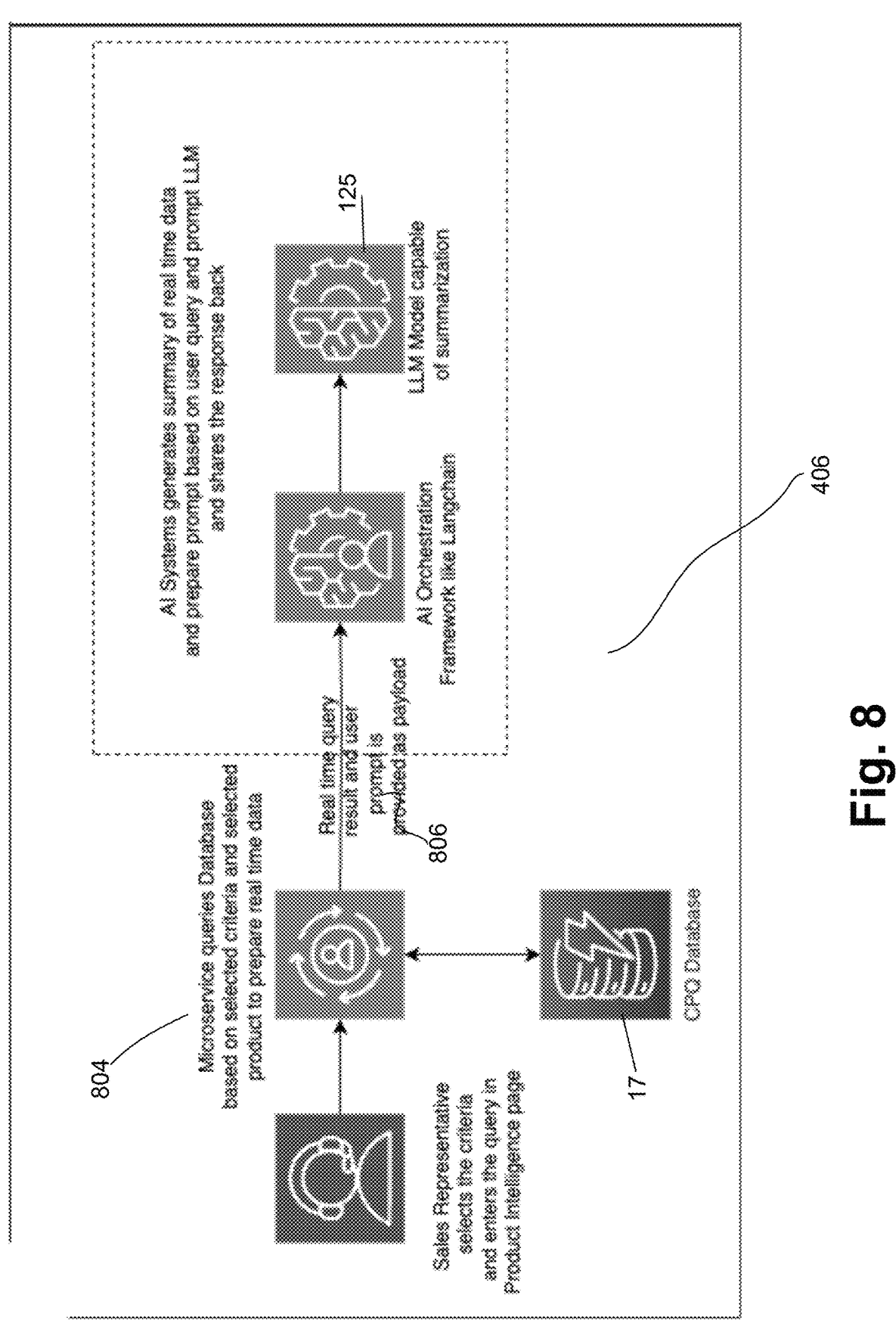
FIG. 8 is a block/flow diagram of a summarizer in accordance to embodiment.

FIG. 8 is a block/flow diagram of summarizer 406 in accordance to embodiment. In general, the summarization is based on real time data obtained by querying the CPQ/configurator DB and a subsequent prompting on the same. Summarization support of Generative AI is very useful for the CPQ use case when a user query is performed on data prepared by querying historical data from the CPQ database at 804. In many scenarios, the CPQ or configurator database 17 does not include all of the needed information. Therefore, summarizer 406 retrieves data from a single source or multiple sources and provides the data as prompts for LLM 125 at 806. One use case is to build a Product summary and display in the Product Intelligence page. Further, in embodiments, summarizer 406 builds a context for executing subsequent fine tuned queries.

For example, a first query from the user is: "Generate summary of previous sales of SUV in last one year in US?" Once the summary is generated, a second query may be "Give me the count of SUV Luxury models sold last year?". A third query may be "Give me the configuration of luxury SUV model sold?". Such fine-tuned query fetch results is based on the previous prompt provided for summarization.

In embodiments, a Cohere command model embedded in OCI can be used for summarizing product information.

Based on the user query and selection, such as a period range or geographical location or customer segment, embodiments can query all product related documents from object storage 126, using the unique product string. The query result is then passed to the LLM 125 as a prompt to generate summarization.

In embodiments, an OCI function can be used to orchestrate various resources such as object storage 127, Oracle 23 AI vector DB 126 and LLM 125. The OCI Function can be accessed as a REST end point from the CPQ "Product Intelligence" page.

Example Cloud Infrastructure

FIGS. 9-12 illustrate an example cloud infrastructure that can implement system 100 that can include knowledge enriched CPQ system 10 of FIG. 1 in accordance to embodiments.

As disclosed above, infrastructure as a service ("IaaS") is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network ("WAN"), such as the Internet, and can use the cloud provider's services to install the remaining elements of an application stack. For example, the user can log in to the IaaS platform to create virtual machines ("VM's), install operating systems ("OS"s) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds ("VPC"s) (e.g., a potentially on-demand pool of configurable and/or shared computing resources), also known as a core network. In some examples, there may also be one or more security group rules provisioned to define how the security of the network will be set up and one or more virtual machines. Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
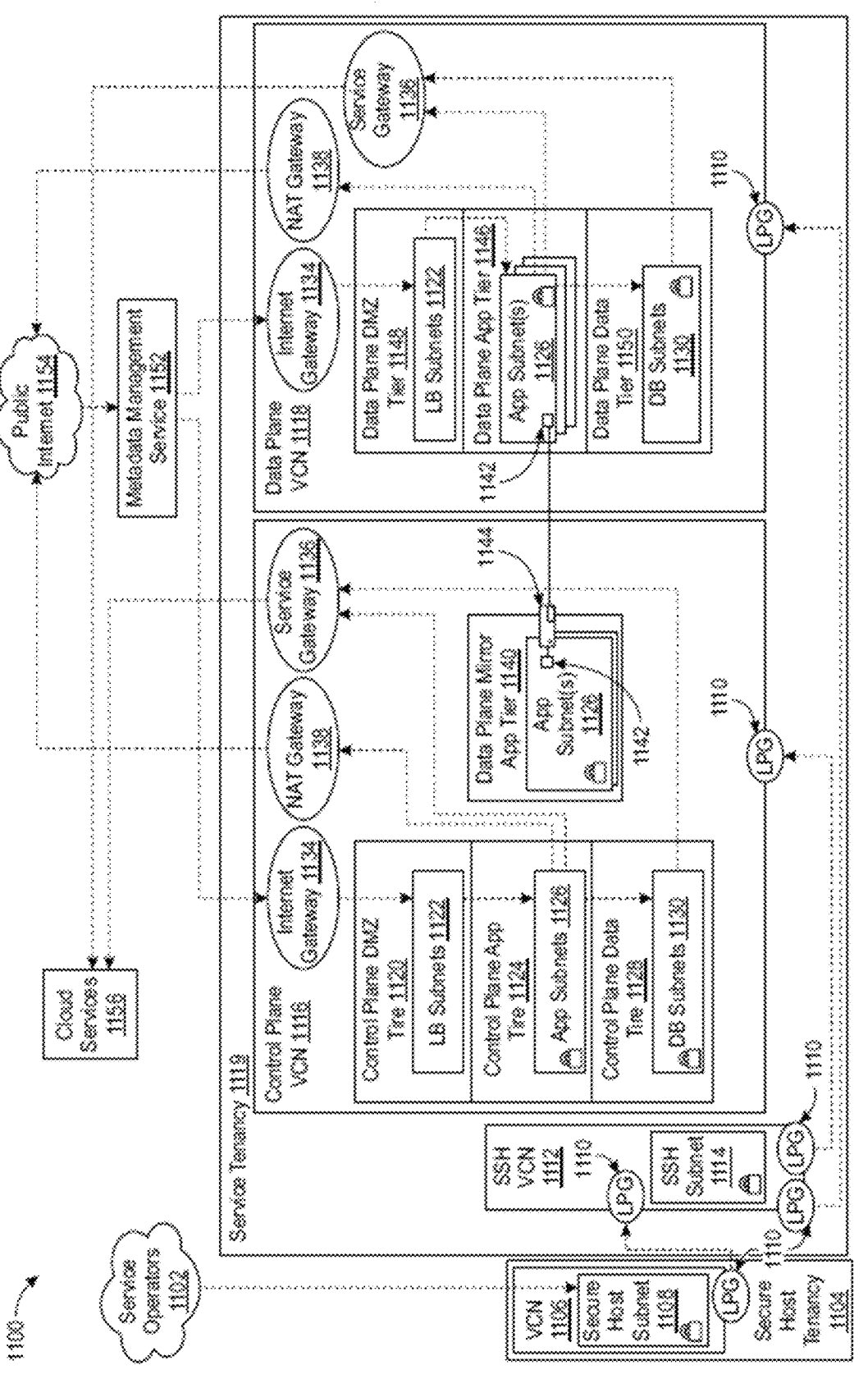
FIGS. 9-12 illustrate an example cloud infrastructure that can implement the system that can include the knowledge enriched CPQ system of FIG. 1 in accordance to embodiments.

FIG. 9 is a block diagram 1100 illustrating an example pattern of an IaaS architecture, according to at least one embodiment. Service operators 1102 can be communicatively coupled to a secure host tenancy 1104 that can include a virtual cloud network ("VCN") 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant ("PDA")) or wearable devices (e.g., a Meta Quest® head mounted display), running software such as Microsoft Windows Mobile®, and/or a variety of mobile operating systems such as iOS, Windows Phone, Android, BlackBerry 8, Palm OS, and the like, and being Internet, e-mail, short message service ("SMS"), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway ("LPG") 1110 that can be communicatively coupled to a secure shell ("SSH") VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone ("DMZ") tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer ("LB") subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively coupled to cloud services 1156.

In some examples, the service gateway 1136 of the control plane VCN 1116 or of the data plane VCN 1118 can make application programming interface ("API") calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete ("CRUD") operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 10:
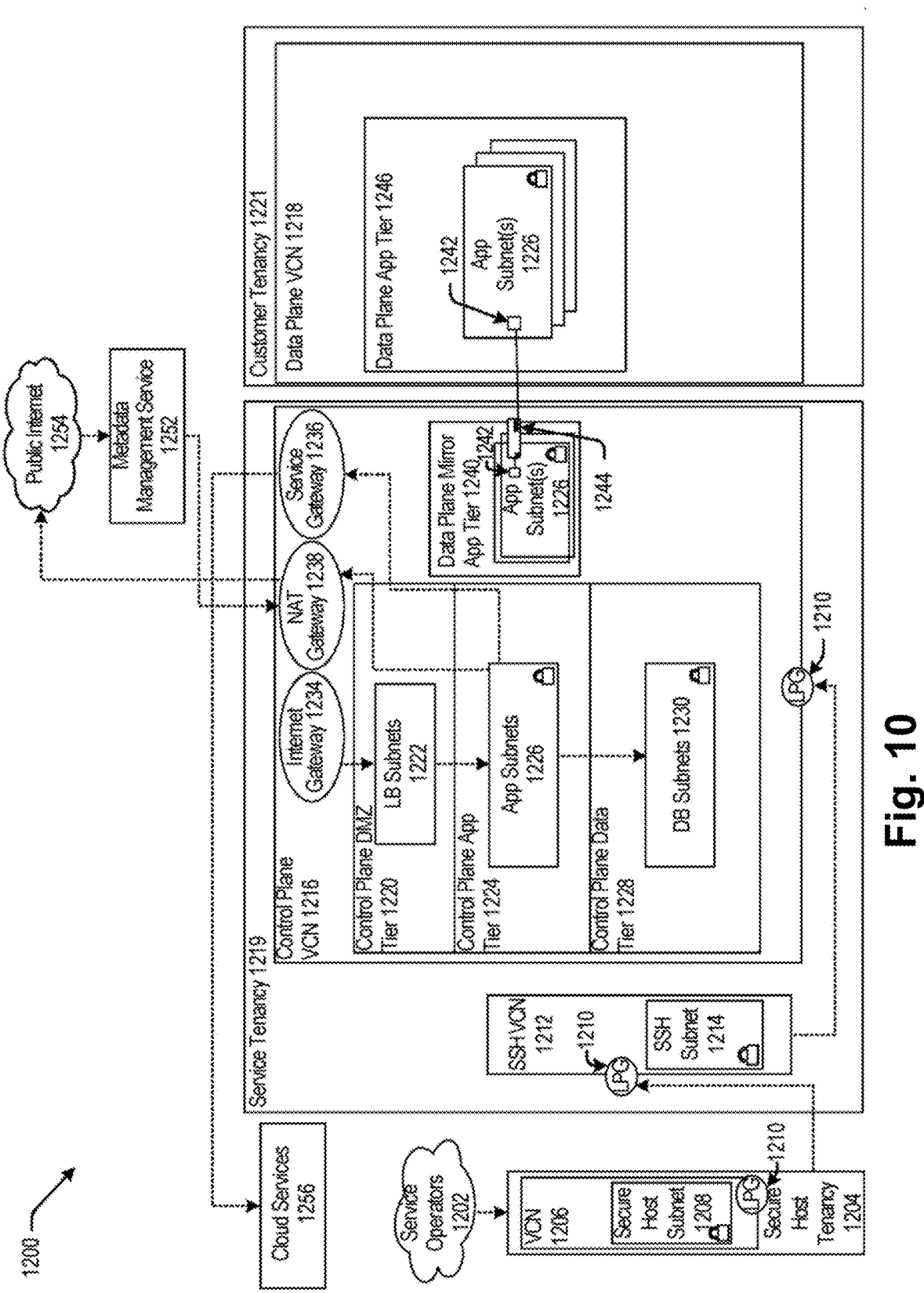

FIG. 10 is a block diagram 1200 illustrating another example pattern of an IaaS architecture, according to at least one embodiment. Service operators 1202 (e.g. service operators 1102) can be communicatively coupled to a secure host tenancy 1204 (e.g. the secure host tenancy 1104) that can include a virtual cloud network (VCN) 1206 (e.g. the VCN 1106) and a secure host subnet 1208 (e.g. the secure host subnet 1108). The VCN 1206 can include a local peering gateway (LPG) 1210 (e.g. the LPG 1110) that can be communicatively coupled to a secure shell (SSH) VCN 1212 (e.g. the SSH VCN 1112 10) via an LPG 1110 contained in the SSH VCN 1212. The SSH VCN 1212 can include an SSH subnet 1214 (e.g. the SSH subnet 1114), and the SSH VCN 1212 can be communicatively coupled to a control plane VCN 1216 (e.g. the control plane VCN 1116) via an LPG 1210 contained in the control plane VCN 1216. The control plane VCN 1216 can be contained in a service tenancy 1219 (e.g. the service tenancy 1119), and the data plane VCN 1218 (e.g. the data plane VCN 1118) can be contained in a customer tenancy 1221 that may be owned or operated by users, or customers, of the system.

The control plane VCN 1216 can include a control plane DMZ tier 1220 (e.g. the control plane DMZ tier 1120) that can include LB subnet(s) 1222 (e.g. LB subnet(s) 1122), a control plane app tier 1224 (e.g. the control plane app tier 1124) that can include app subnet(s) 1226 (e.g. app subnet(s) 1126), a control plane data tier 1228 (e.g. the control plane data tier 1128) that can include database (DB) subnet(s) 1230 (e.g. similar to DB subnet(s) 1130). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134) that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238 (e.g. the NAT gateway 1138). The control plane VCN 1216 can include the service gateway 1236 and the NAT gateway 1238.

The control plane VCN 1216 can include a data plane mirror app tier 1240 (e.g. the data plane mirror app tier 1140) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152) that can be communicatively coupled to public Internet 1254 (e.g. public Internet 1154). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet (s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218, but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 8, "may be located in Region 1 and in "Region 2." If a call to Deployment 8 is made by the service gateway 1236 contained in the control plane VCN 1216 located in Region 1, the call may be transmitted to Deployment 8 in Region 1. In this example, the control plane VCN 1216, or Deployment 8 in Region 1, may not be communicatively coupled to, or otherwise in communication with, Deployment 8 in Region 2.

Figure 11:
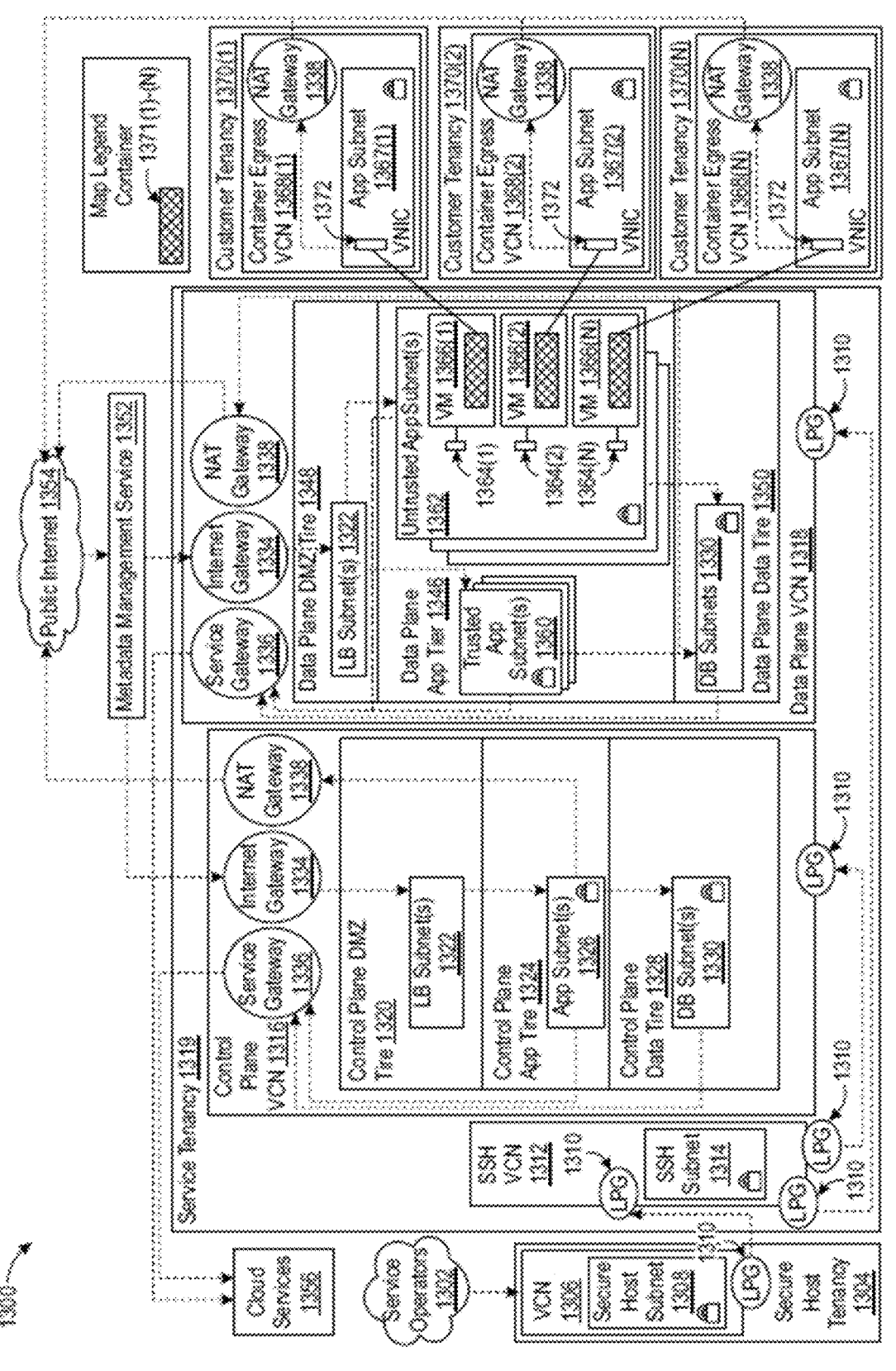

FIG. 11 is a block diagram 1300 illustrating another example pattern of an IaaS architecture, according to at least one embodiment. Service operators 1302 (e.g. service operators 1102) can be communicatively coupled to a secure host tenancy 1304 (e.g., the secure host tenancy 1104) that can include a virtual cloud network (VCN) 1306 (e.g., the VCN 1106) and a secure host subnet 1308 (e.g., the secure host subnet 1108). The VCN 1306 can include an LPG 1310 (e.g., the LPG 1110) that can be communicatively coupled to an SSH VCN 1312 (e.g., the SSH VCN 1112) via an LPG 1310 contained in the SSH VCN 1312. The SSH VCN 1312 can include an SSH subnet 1314 (e.g., the SSH subnet 1114), and the SSH VCN 1312 can be communicatively coupled to a control plane VCN 1316 (e.g., the control plane VCN 1116) via an LPG 1310 contained in the control plane VCN 1316 and to a data plane VCN 1318 (e.g., the data plane 1118) via an LPG 1310 contained in the data plane VCN 1318. The control plane VCN 1316 and the data plane VCN 1318 can be contained in a service tenancy 1319 (e.g., the service tenancy 1119).

The control plane VCN 1316 can include a control plane DMZ tier 1320 (e.g. the control plane DMZ tier 1120) that can include load balancer ("LB") subnet(s) 1322 (e.g., LB subnet(s) 1122), a control plane app tier 1324 (e.g., the control plane app tier 1124) that can include app subnet(s) 1326 (e.g., similar to app subnet(s) 1126), a control plane data tier 1328 (e.g. the control plane data tier 1128) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1134) that can be contained in the control plane VCN 1316, and the app subnet(s) 1326 can be communicatively coupled to the DB subnet(s) 1330 contained in the control plane data tier 1328 and to a service gateway 1336 (e.g., the service gateway) and a network address translation (NAT) gateway 1338 (e.g., the NAT gateway 1138). The control plane VCN 1316 can include the service gateway 1336 and the NAT gateway 1338.

The data plane VCN 1318 can include a data plane app tier 1346 (e.g. the data plane app tier 1146), a data plane DMZ tier 1348 (e.g., the data plane DMZ tier 1148), and a data plane data tier 1350 (e.g., the data plane data tier 1150 of FIG. 10). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154).

The Internet gateway 1334 contained in the control plane VCN 1316 and contained in the data plane VCN 1318 can be communicatively coupled to a metadata management service 1352 (e.g. the metadata management system 1152) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371 (1)-(N) may be communicatively coupled to the customer tenancy 1370 and may be configured to transmit or receive data from the customer tenancy 1370. The containers 1371 (1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 12:
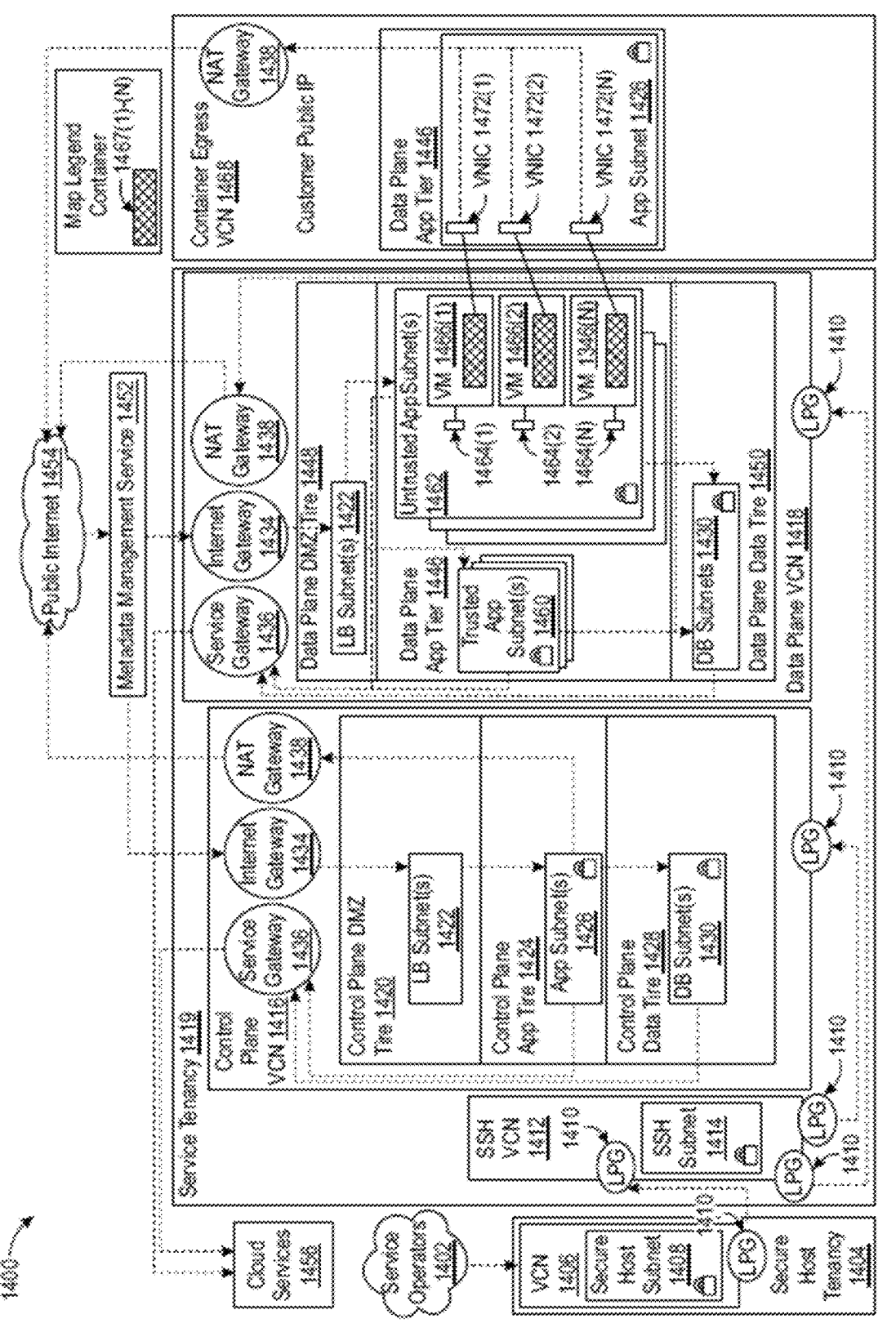

FIG. 12 is a block diagram 1400 illustrating another example pattern of an IaaS architecture, according to at least one embodiment. Service operators 1402 (e.g., service operators 1102) can be communicatively coupled to a secure host tenancy 1404 (e.g., the secure host tenancy 1104) that can include a virtual cloud network ("VCN") 1406 (e.g., the VCN 1106) and a secure host subnet 1408 (e.g. the secure host subnet 1108). The VCN 1406 can include an LPG 1410 (e.g., the LPG 1110) that can be communicatively coupled to an SSH VCN 1412 (e.g., the SSH VCN 1112) via an LPG 1410 contained in the SSH VCN 1412. The SSH VCN 1412 can include an SSH subnet 1414 (e.g. the SSH subnet 1114), and the SSH VCN 1412 can be communicatively coupled to a control plane VCN 1416 (e.g., the control plane VCN 1116) via an LPG 1410 contained in the control plane VCN 1416 and to a data plane VCN 1418 (e.g., the data plane 1118) via an LPG 1410 contained in the data plane VCN 1418. The control plane VCN 1416 and the data plane VCN 1418 can be contained in a service tenancy 1419 (e.g., the service tenancy 1119).

The control plane VCN 1416 can include a control plane DMZ tier 1420 (e.g., the control plane DMZ tier 1120) that can include LB subnet(s) 1422 (e.g. LB subnet(s) 1122), a control plane app tier 1424 (e.g., the control plane app tier 1124) that can include app subnet(s) 1426 (e.g. app subnet(s) 1126), a control plane data tier 1428 (e.g. the control plane data tier 1128) that can include DB subnet(s) 1430 (e.g., DB subnet(s) 1330). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 10) and a network address translation (NAT) gateway 1438 (e.g. the NAT gateway 1138 of FIG. 10). The control plane VCN 1416 can include the service gateway 1436 and the NAT gateway 1438.

The data plane VCN 1418 can include a data plane app tier 1446 (e.g. the data plane app tier 1146), a data plane DMZ tier 1448 (e.g. the data plane DMZ tier 1148), and a data plane data tier 1450 (e.g. the data plane data tier 1150). The data plane DMZ tier 1448 can include LB subnet(s) 1422 that can be communicatively coupled to trusted app subnet(s) 1460 (e.g. trusted app subnet(s) 1360) and untrusted app subnet(s) 1462 (e.g. untrusted app subnet(s) 1362) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154).

The Internet gateway 1434 contained in the control plane VCN 1416 and contained in the data plane VCN 1418 can be communicatively coupled to a metadata management service 1452 (e.g. the metadata management system 1152) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 may be considered an exception to the pattern illustrated by the architecture of block diagram 1300 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers

1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

In embodiments, CPQ customer instances are provisioned and maintained in data plane of OCI with the help of the OCI "Resource Manager" and "Service Manager" tool. OCI Resource Manager is a fully managed service designed to automate the deployment and management of OCI resources using Infrastructure as Code ("IaC") principles. It is based on Terraform, a popular open-source IaC tool, and allows users to define and manage cloud resources in a declarative way. Containerized CPQ application is deployed and maintained in a OCI Compute Instance in App subnet using service manager tool. Single/multiple Compute Instance nodes having CPQ application provisioned is/are configured as backend servers of provisioned CPQ LBaaS (Load Balancer as Service) instances. CPQ provisioning involves steps to configure networking components, load balancer and security settings to ensure the application is accessible via the internet while maintaining security. CPQ LBaaS instance is provisioned in LB subnet. CPQ Database is provisioned in the Database subnet. CPQ uses a Oracle's relational database system to store data in embodiments.

As disclosed, embodiments provide a framework for enriching a configurator by providing users with information for faster and timely closure of sales. Embodiments provide a framework for users to upload documents specific to their product and the documents related to product's previous sales. Embodiments configure an object storage bucket to upload the documents. Embodiments integrate the REST endpoint of object storage bucket to store product related document in object storage. Before storing the document, each document should be uniquely identified by product string which will be unique for each product in configurator. Documents are then tokenized and stored in a vector database to enable semantic search. In response to product sales document, product manual, invoice, sales contract/agreement and network diagrams being uploaded to the system, embodiments provide a Product Intelligence tab in the configurator which will generate intelligent information about the selected product in configurator mining and analyzing historic data in the vector data base. Enriched intelligence/information can include: chatbot integration, trending configuration, past sales summary, product summary and product review summary.

Embodiments enhance AI quality by enabling LLMs to tap all data sources without retraining. Through this, embodiments build knowledge repositories and information is updated accordingly in AI so that the information is more accurate, contextual, and timely. Implementation of embodiments includes the integration of vector databases which allow for the rapid coding of new data sets and it searches as per the data fed into LLM.

In embodiments, each customer instance of CPQ/configurator 10 will have customer specific products. Embodiments can be built with details of products which are offered for sale to customers. Therefore, system 10 enhances the domain or business specific knowledge base which needs to be built in each CPQ deployment providing product specific documents. Embodiments build the knowledge base of products offered for sale without altering LLM parameters. Therefore, embodiments are cost effective and enhance LLM capabilities by augmenting the domain knowledge from the CPQ system. Further, the CPQ has historic data or dynamically updated information from day to day transactions. Mining this historic data provides business specific information. This information as well can be used to generate Product Intelligence.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of operating a cloud based product configurator, the method comprising:
   storing, as vectorized data in a vector database, product information corresponding to a first product to be configured, the product information comprising structured and unstructured documents, the unstructured documents comprising at least an image, wherein the storing comprises generating vector embeddings of the structured and unstructured documents;
   while configuring the first product via interacting with the product configurator, receiving a query regarding the first product, wherein configuring the first product comprises generating for the first product a configuration, a price and a quote;
   augmenting the query in response to a context based semantic search of the vector database using the query, wherein the augmented query comprises the query and the response to a context based semantic search of the vector database;
   prompting a large language model (LLM) using the augmented query and receiving an LLM response; and
   providing the LLM response in response to the query.

2. The method of claim 1, the storing comprising:
   storing the vector embeddings in a vector database as numerical vectors.

3. The method of claim 2, further comprising uploading the structured and unstructured documents into object storage as objects, each object including a content of the document and corresponding metadata.

4. The method of claim 3, wherein the object storage comprise corresponding representational state transfer end points to provide an upload of the documents.

5. The method of claim 2, the receiving is in response to selecting an upload files option during a session with the product configurator on a page that displays the first product.

6. The method of claim 5, further comprising assigning a product string to the first product that uniquely identifies the first product.

7. The method of claim 1, wherein the receiving the query is via a chatbot.

8. The method of claim 1, further comprising generating a summary of the first product and displaying the summary during a product configurator session.

9. A non-transitory computer readable medium having instructions stored thereon that, when executed by one or more processors, cause the processor to operate a cloud based product configurator, the operating comprising:
   storing, as vectorized data in a vector database, product information corresponding to a first product to be configured, the product information comprising structured and unstructured documents, the unstructured documents comprising at least an image, wherein the storing comprises generating vector embeddings of the structured and unstructured documents;
   while configuring the first product via interacting with the product configurator, receiving a query regarding the first product, wherein configuring the first product comprises generating for the first product a configuration, a price and a quote;
   augmenting the query in response to a context based semantic search of the vector database using the query, wherein the augmented query comprises the query and the response to a context based semantic search of the vector database;
   prompting a large language model (LLM) using the augmented query and receiving an LLM response; and
   providing the LLM response in response to the query.

10. The computer readable medium of claim 9, the storing comprising:
   storing the vector embeddings in a vector database as numerical vectors.

11. The computer readable medium of claim 10, the operating further comprising uploading the structured and unstructured documents into object storage as objects, each object including a content of the document and corresponding metadata.

12. The computer readable medium of claim 11, wherein the object storage comprise corresponding representational state transfer end points to provide an upload of the documents.

13. The computer readable medium of claim 10, the receiving is in response to selecting an upload files option during a session with the product configurator on a page that displays the first product.

14. The computer readable medium of claim 13, the operating further comprising assigning a product string to the first product that uniquely identifies the first product.

15. The computer readable medium of claim 9, wherein the receiving the query is via a chatbot.

16. The computer readable medium of claim 9, the operating further comprising generating a summary of the first product and displaying the summary during a product configurator session.

17. A cloud based product configurator system comprising:

a vector database;

a large language model (LLM);

one or more processors coupled to the vector database and LLM, the processors configured to:

store, as vectorized data in the vector database, product information corresponding to a first product to be configured, the product information comprising structured and unstructured documents, the unstructured documents comprising at least an image, wherein the storing comprises generating vector embeddings of the structured and unstructured documents;

while configuring the first product via interacting with the product configurator, receive a query regarding the first product, wherein configuring the first product comprises generating for the first product a configuration, a price and a quote;

augment the query in response to a context based semantic search of the vector database using the query, wherein the augmented query comprises the query and the response to a context based semantic search of the vector database;

prompting the LLM using the augmented query and receiving an LLM response; and provide the LLM response in response to the query.

18. The system of claim 17, the storing comprising:

storing the vector embeddings in a vector database as numerical vectors.

19. The system of claim 18, the processors further configured to the structured and unstructured documents into object storage as objects, each object including a content of the document and corresponding metadata.

20. The system of claim 18, wherein the receiving is in response to selecting an upload files option during a session with the product configurator on a page that displays the first product.

\* \* \* \* \*